July 17, 1934.    P. P. PIPES    1,967,132
BONDING TOOL
Original Filed April 2, 1929
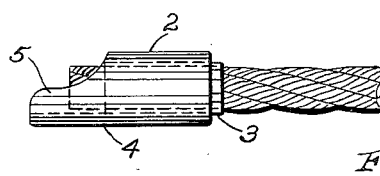
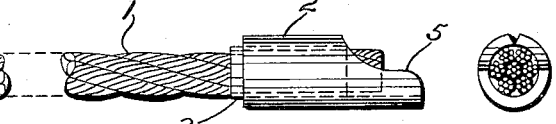
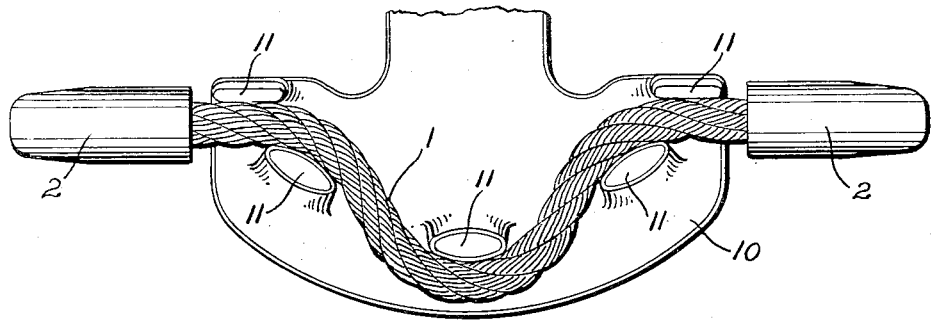
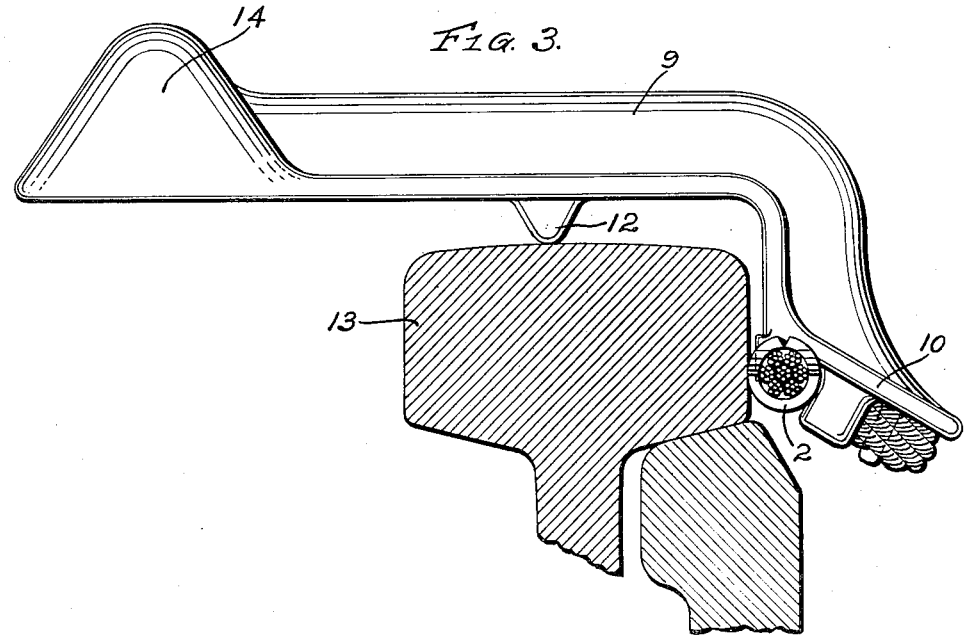
Inventor
PLINY P. PIPES
By
Attorney Patented July 17, 1934

1,967,132

UNITED STATES PATENT OFFICE 1,967,132

BONDING TOOL

Pliny P. Pipes, Mansfield, Ohio, assignor to The Ohio Brass Company, Mansfield, Ohio, a corporation of New Jersey Original application April 2, 1929, Serial No. 351,883. Divided and this application June 22, 1932, Serial No. 618,650

7 Claims. (Cl. 113—99)

My invention relates to means for bonding rails, that is, efficiently connecting two or more rails which are required to carry current.

One of the objects of my invention is to provide a tool for maintaining the bond in a formed condition while applying the bond to the rail.

In the drawing accompanying this specification:—

Fig. 1 is a view in elevation of a rail bond prior to its application to the rail.

Fig. 2 is an end view of Fig. 1.

Fig. 3 is a view of the bond shown in Fig. 1 secured to a forming and holding tool or device prior to its application to the rail.

Fig. 4 is a side view of Fig. 3 with the bond and holding device in position upon the side surface of the rail prior to the welding operation securing the bond to the rail.

It is found that bonds having the flexible portion of copper have relatively short life under steam road service due apparently to the severe conditions at the joints as trains of many cars pass over such joints. Bonds, however, formed of a body composed of a plurality of wires of high tensile strength such as those of iron, carbon-steel or alloyed-steel will have a far greater life than a bond having a copper body and apparently the higher the tensile strength the greater the life, but as the tensile strength increases or the carbon content of the steel increases the body will yieldably resist formation to a greater degree and the body may possess such a higher resistance to forming that it is quite difficult to form the body and maintain such form prior to its attachment to the rail.

I have, therefore, devised a tool by means of which the flexible portion of the bond may be given the proper formation before the bond is applied to the rail and to maintain such formation while the bond is being applied. After such a bond has been welded to the rail or otherwise secured thereto the formation will be maintained without the assistance of the tool.

It might be said in explanation that the heat treatment to which the body wires are subjected will affect materially the life and resilient or spring properties of the bond body.

In making up a bond of my improved construction I prefer a body 1 with a ferrous or non-ferrous terminal 2 on one or both ends and fixedly secured thereto with or without an interposed sleeve 3. I prefer the terminal of ferrous metal and the sleeve may be of ferrous or non-ferrous metal. The terminal 2 may be stamped from a sheet to the desired shape and then formed to fit the body, after which it is secured to the body with a greater or less degree of pressure and with or without the sleeve 3. If sufficient compression is used the wires of the body will be found to make impressions in the sleeve or surface of the terminal providing the stock of which the terminal is made is softer than the body 1 and when the sleeve 3 is of copper or other non-ferrous materials the copper tends to flow into the voids between the outer wires of the body.

The terminal is composed of the tubular portion 4 and the projecting portion 5 which supports the fused attaching metal for uniting the terminal and end face of the body each to the rail.

The forming and holding tool comprises a body member 9 which overhangs the rail on each side and has a portion 10 provided with projections 11 spaced apart and so aligned with respect to a median line corresponding to the longitudinal axis of the bond body that the body 1 of the bond can be positioned between the projections 11 and thereby held in a formed shape until the terminals are finally welded to the rail. The body will thereafter be maintained in its formed position having a loop-shaped portion at the center. This loop portion is essential in that it adds to the flexibility of the bond body and permits relative longitudinal movement of the adjacent rails.

It should be noted that the bond body tends to maintain or assume a straight line position as shown in Fig. 1 due to its resiliency and that the members 11 will resist a return movement of the cable to a straight form and hold the body in the formed condition during the welding operation. The forming tool has a portion 12 which projects from the member 9 and rests upon the upper surface of the rail 13 and is also provided with a weighted portion 14 which to a considerable extent balances the tool against the combined weight of the portion 10 and the bond, therefore, it is merely necessary after positioning the bond between the lugs 11 to place the tool upon the rail with the terminals 2 against the side surface of the rail and the over-balanced weight of the bond and portion 10 will cause the terminals to maintain their contact with the rail until welded into position.

If it is not desired to support the bond in position by means of the forming tool during the welding operation then the portions 10 and 11 only will be required and the portion 10 will protect the body 1 of the bond from the heating flame due to welding.

This application is a division of my case Serial No. 351,883 filed April 2, 1929.

There are modifications which will suggest themselves to those skilled in the art and, therefore, I wish to be limited only by my claims.

I claim:—

1. A bonding tool comprising a body member, three spaced and projecting members from the body to receive a bond body therebetween and form the body with a predetermined curvature and two other spaced and projecting members from the body to bring the terminals into axial alignment and maintain such alignment while the bond terminals are being secured to rails.

2. A bonding tool arranged to be applied to a bond before installation and removable after installation comprising a body member, a plurality of spaced members projecting in substantially the same direction from the body member and arranged to receive therebetween and grip the body only of the bond and give it a predetermined formation and to retain the said formation while the bond is being secured in position on the rail, the terminals of the bond projecting away from each other and free of the body member and in axial alignment.

3. A bonding tool comprising a body member having fine projecting means thereon to receive and hold the flexible body of the bond in a predetermined formation while attaching the bond to the rail surface and three of said means located on one side of a median line corresponding to the longitudinal axis of the formed bond body and the other two lugs located on the opposite side of the median line and all lugs arranged to engage the body of the bond and means overhanging the rail on the opposite side from that to which the bond is attached to counter-balance the weight of the bond and tool.

4. A bonding tool comprising a body member of plate-like formation, three spaced and projecting lugs from one face of the body to receive the body of a bond in contact with the said lugs and a pair of spaced lugs projecting from the body of the tool in the same direction as the aforesaid lugs and to press against the bond body to hold it in contact with the aforesaid three lugs.

5. A bonding tool arranged to be applied to a bond body before installation of the bond and removable after installation comprising a body member, a plurality of members spaced and projecting in substantially the same direction from the bond body, the lugs staggered from a median line corresponding to the curved axis of the bond body and forming the equivalent of a groove to receive the bond body and maintain the predetermined shape of the body while installing the bond.

6. A bonding tool arranged to be applied to a bond body before installation of the bond and removable after installation comprising a body member, spaced means projecting from the body and in the same direction and positioned on opposite sides of a median line corresponding to the curved longitudinal axis of the bond after installation to receive the bond body and maintain the predetermined shape of the bond body while installing.

7. A bonding tool comprising a body member having five projecting means thereon to receive and hold the flexible body of the bond in a predetermined formation while attaching the bond to the rail surface and three of said means located on one side of a median line corresponding to the longitudinal axis of the formed bond body and the other two lugs located on the opposite side of the median line and all lugs arranged to engage the body of the bond.

PLINY P. PIPES.